Dec. 9, 1952     J. R. SPALDING     2,621,233
APPARATUS FOR MEASURING MOISTURE IN SHEET MATERIAL
Filed Feb. 8, 1951     2 SHEETS—SHEET 1
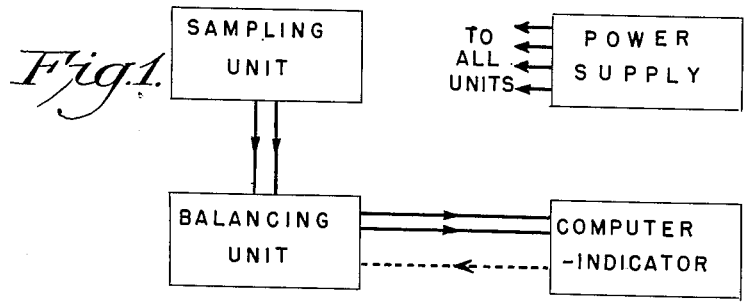
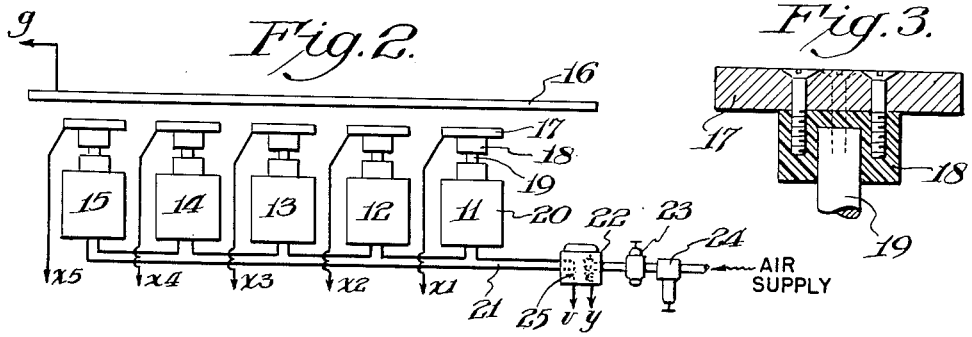
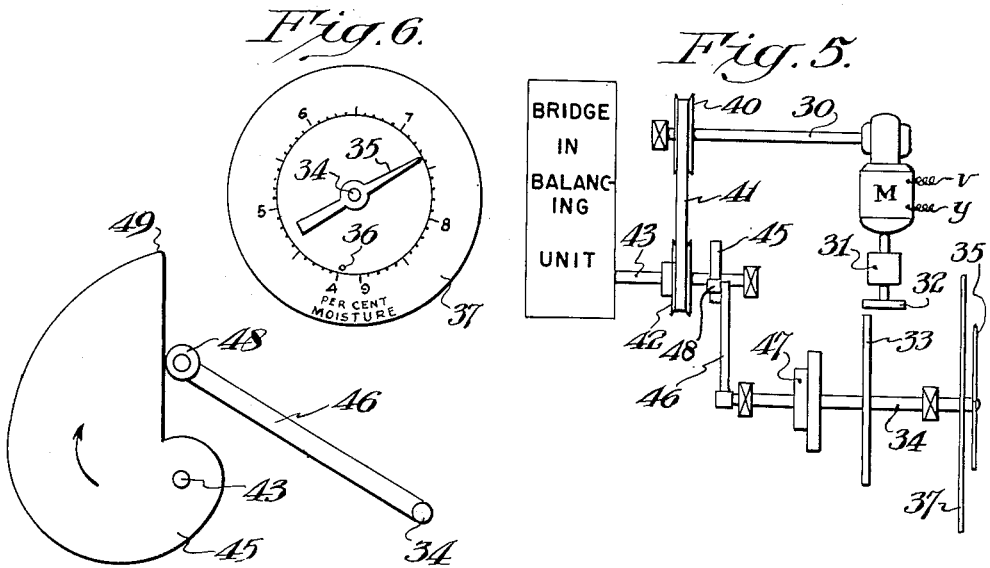
*INVENTOR.*
JOHN ROBERT SPALDING
BY
*Norris E. Ruckman*
*ATTORNEY.*

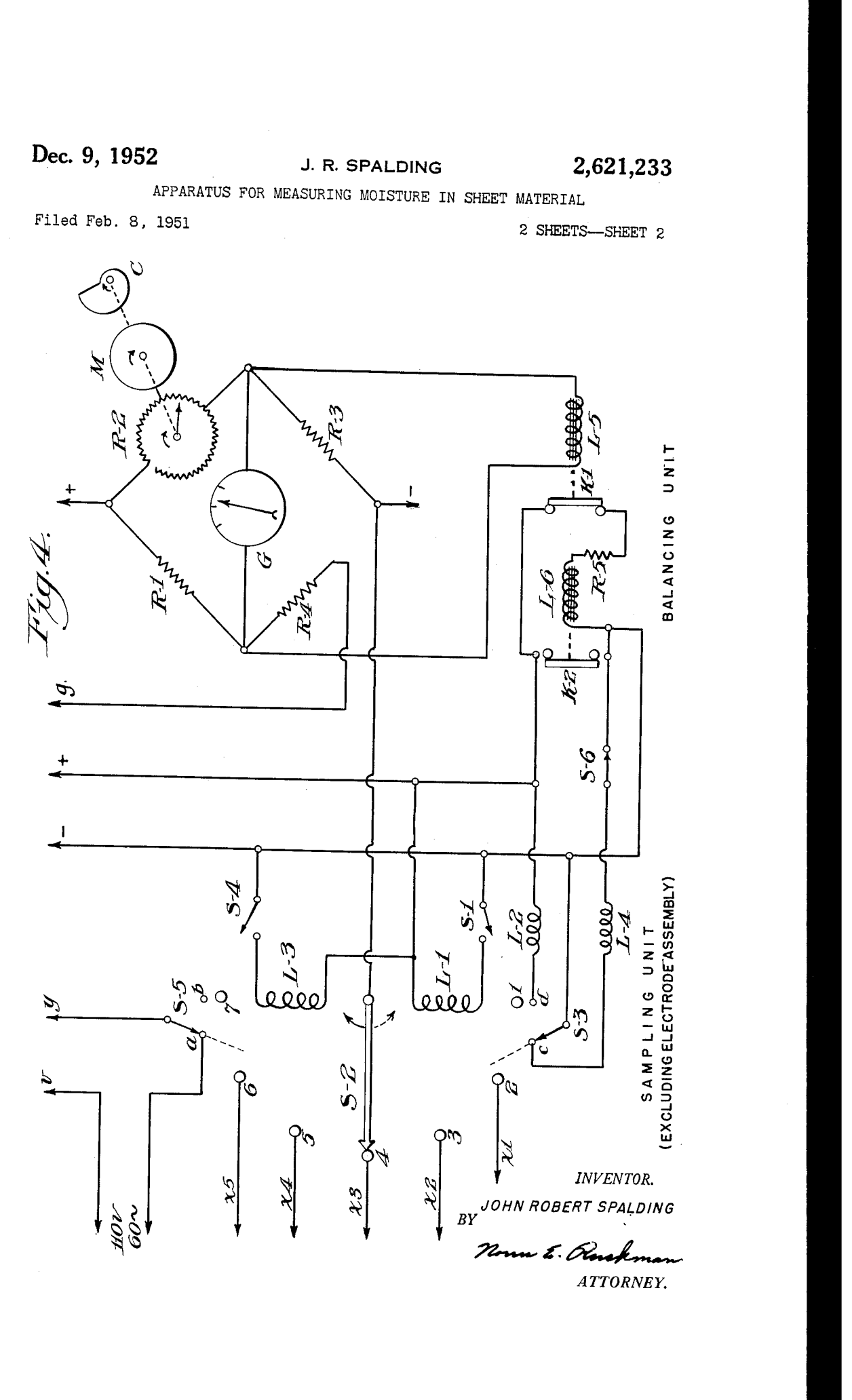

Patented Dec. 9, 1952

2,621,233

UNITED STATES PATENT OFFICE 2,621,233

APPARATUS FOR MEASURING MOISTURE IN SHEET MATERIAL

John Robert Spalding, Kenmore, N. Y., assignor to E. I. du Pont de Nemours and Company, Wilmington, Del., a corporation of Delaware Application February 8, 1951, Serial No. 210,054

6 Claims. (Cl. 175—183)

This invention relates to apparatus for measuring moisture in organic material, and is more particularly concerned with electrical apparatus for determining moisture in sheets composed of wood-pulp or cotton linters by measuring the electrical conductivity with means including a self-balancing high resistance bridge.

The moisture content of many substances changes appreciably when the humidity of the surrounding atmosphere varies. It is often necessary or desirable to know how much water is associated with such a substance, whether it be a raw material or an intermediate or finished product. This is especially true for chemical industries such as in the manufacture of textile fibers or cellophane from cellulose. Cellulose, in particular, is subject to extensive and rapid fluctuations in moisture content. This has given rise to widespread effort in the rayon industry to control the humidity of the air more closely and to measure more often and more precisely the amount of water present in cellulose, and its derivatives, in the several physical forms in which it may be present.

The electrical conductivity of cellulosic materials is a function of the moisture content. In the case of organic sheet materials processed under uniform conditions, e. g., sheets composed of wood-pulp or cotton linters, the moisture content is the only variable having any significant effect on the conductivity. Hence apparatus can be designed to determine the moisture content by measuring the conductivity.

It is an object of the present invention to provide an apparatus for automatically making rapid, accurate determinations of moisture in otherwise substantially uniform lots or shipping units of organic material, and which will be especially well adapted for determining moisture in sheets of cellulosic materials, without harming the material and without requiring skilled analysts. Other objects of the invention will become apparent from the following description, the drawings, and appended claims.

In the drawings, which illustrate preferred embodiments of the invention,

Figure 1 is a block diagram of the apparatus, intended to give a general idea of the several components and their interrelation, Figure 2 is a plan view of an arrangement of electrodes for contacting sheet material during measurement, Figure 3 is a cross-section of an electrode head, Figure 4 is a circuit diagram of most of the electrical components of the apparatus, Figure 5 is a top view of the mechanical components for varying a resistor in the electrical circuit and indicating the results of measurements, Figure 6 is a front elevation of a pointer and dial for indicating the results, and Figure 7 is a detail view of a computing cam and follower for transforming electrical measurements into moisture values.

The objects of the invention have been achieved by employing a combined electrical and mechanical apparatus, shown schematically in Fig. 1, consisting of a power supply, which is a unit for supplying electrical energy to the other components in the various desired forms; a sampling unit, which is a component for making a number of readings at different locations on the sheet so as to produce a valid overall moisture figure; a balancing unit, which is the heart of the measurement activity; and a computer-indicator, which produces the result of the measurement in an intelligible form. These components are described below, except for the power supply, a standard unit that will be mentioned in the descriptions of the other components sufficiently for it to be fully understood. The paragraphs immediately following constitute a general description of the apparatus of this invention and of its operation, both of which will be treated in more detail later.

In general, the apparatus operates in the following manner: After the material whose moisture content is to be measured arrives at the measuring location, electrodes contact it firmly, and a potential is applied through the material between one electrode pair. The potential drop created through the material is compared with a series of known potential drops, and eventually a match or balance is reached, whereupon the measuring process ceases. The repetition of this balancing procedure for all the electrode pairs constitutes a complete sampling. The data obtained by this sampling are translated into moisture figures and averaged. A visual indication of the average moisture appears at the output end of the instrument. The operator, who may be relatively unskilled since the operation is almost entirely automatic, then records the result. The entire measurement requires only a few seconds.

The size and shape of the electrodes that contact the material depend in large part upon the kind and thickness of substance undergoing the measurement. Where the measurement is made through an appreciable thickness of sheet material, such as cellulose pulp sheet, a sequence of circular conducting objects on one side and a conducting bar on the other have proved adequate as electrode pairs. A suitable arrangement, shown in Figures 2 and 3, employs five circular electrodes on one side of the sheet backed-up with a single electrode bar on the other side of the sheet. With this arrangement the potential drop is measured through sheet material at five locations. However, when it is desired to measure the potential drop through the material at one surface, electrodes of the types disclosed in my copending application Serial No. 210, 053, filed February 8, 1951, may be used. Moisture can be determined in materials of the type discussed in my copending application by merely changing to those electrodes.

The left-hand portion of Fig. 4 contains a circuit diagram of the sampling unit. It shows the connections for the various electrode pairs and the mechanism for switching from one pair to another. The actuating impulses for the switching originate elsewhere, as is briefly indicated in the diagram and as will be explained more fully in discussion of the other components. The stepping relay successively connects all the electrode pairs to the balancing unit, which consists of a high-resistance Wheatstone bridge and a pair of relays. Included in the right-hand portion of Fig. 4 are the wiring of the balancing unit and a schematic suggestion of some of the associated parts in the other components. The resistance existing across the gap of each electrode pair is connected in turn into one of the arms of the bridge. In another arm is a circular resistor or potentiometer with a motor-driven wiper arm. While each pair of electrodes is connected to the bridge, the motor rotates the potentiometer wiper arm, varying the resistance continuously. Sooner or later the potential drop across the bridge indicator falls to zero and reverses direction, operating associated relays to conclude an individual measurement, although the motor continues to vary the value of the adjustable resistor or potentiometer throughout its entire range.

Also connected to the motor shaft is the computer-indicator, a device for transforming the amount of rotation undergone up until the measurement end-point into some sort of intelligible indication of the value of the measured variable. Either electrical or mechanical systems, or a combination of the two, may be used. A mechanical system that has proved satisfactory appears in Figures 5, 6 and 7. This component produces a dial and pointer type of visual indication. The potentiometer shaft rotation actuates the dial pointer by means of a cam so shaped as to cause equal increments of displacement of the pointer shaft for equal increments of moisture being measured. A typical cam shape is shown in Fig. 7. The shape of such a cam is determined empirically; it is very likely a function of the kind of material with which the electrodes are in contact. Tests with $\frac{1}{32}$ inch wood-pulp sheets have revealed that the cam need not provide a great correction, and that the relationships of the moisture content of the cellulose with its resistance and the angular increment of the potentiometer measuring resistance are both approximately logarithmic.

The dial calibration does not begin at zero moisture because this is never encountered in practice. Instead, for this particular application of the apparatus the minimum setting corresponds to four percent moisture in the cellulose sheet. The maximum provided is nine percent, which exceeds the moisture of most pulp-sheets used in the viscose process. To produce an average of the readings taken on any one sheet, the pointer rotation for each of the five masurements taken appears as one-fifth of the individual value. The five readings are cumulatively indicated by the pointer, so that the dial reading at the end of the fifth measurement is the arithmetic mean of all five. Of course, by suitable modification of the linkage or of the dial-scale any other number of measurements could be employed. The selection of five individual readings represents a desirable compromise between the opposing goals of extreme accuracy and extreme rapidity of measurement.

A preferred embodiment of the invention is now described. The sampling electrodes shown in Fig. 2 comprise an array of five elements 11 to 15 inclusive, arranged in a straight line and spaced to contact representative portions of one surface of a sheet of material for which the moisture content is to be measured. A single fixed electrode bar 16 is arranged to contact the other surface of the sheet opposite to the electrodes 11 to 15. Each of the electrodes 11 to 15 has a circular face plate 17, of conducting material, attached to an insulator 18, which is in turn attached to a piston rod 19. Details of a suitable construction are shown in Fig. 3. The piston rod connects with a piston within cylinder 20 arranged to press the plate 17 against the sheet material when pressure fluid is admitted to the cylinder. Each cylinder is connected to a common manifold 21 leading to a supply of compressed air or other fluid under pressure. In the manifold are an electrically operated cut-off valve 22, a pressure regulator valve 23, and a manually operated cut-off valve 24. Electrical leads to a solenoid 25 operating valve 22, and to the electrodes 11 to 16, are indicated by lines bearing symbols $v$, $y$, $x-1$ to $x-5$ and $g$, respectively.

The operator inserts the sheet material to be measured between common electrode 16 and electrodes 11 to 15 and momentarily depresses "start" switch S-1 (Fig. 4), which connects reset coil L-1 to a source of continuous unvarying electrical potential furnished by the power supply (not shown) through leads "+" and "—". The magnetic field set up by current flowing in L-1 returns the contactor of switch S-2 to terminal 1.

If the instrument had previously completed an entire series of readings, the contactor of switch S-2 was at terminal 7 before the "start" button was depressed. There is no other connection to that terminal, but when S-2 moved from 6 to 7, the contactor of "stop" switch S-5 went from terminal $a$ to terminal $b$, opening the solenoid and scan motor circuits. The subsequent resetting of S-2 then closed S-5, energizing solenoid 25 of valve 22 and scan motor M from the usual 110 volt, 60 cycles per second power line. The solenoid opens valve 22, permitting a fluid such as air to reach pressure cylinders 20 of electrodes 11 to 15 inclusive, clamping the sheet material firmly between them.

Scan motor M, operating upon direct current, rotates unidirectionally at constant speed turning drive shaft 30 (Fig. 5). As the contactor of S-2 passes between terminals 2 and 1 on its return to terminal 1 during resetting, the contactor arm of pointer reset switch S-3 moves to position $d$, energizing pointer reset clutch coil L–2 from the direct supply potential. Pointer reset clutch 31 forces friction disc 32 against wheel 33, carried upon pointer shaft 34, causing pointer 35 to rotate backwards until it hits a stop pin 36 (Fig. 6), located at the minimum reading of dial 37. Slippage then takes place between the friction disc and wheel until completion of the resetting cycle. Of course, this resetting operation could be performed manually.

In the meanwhile, drive wheel 40 on shaft 30 has been rotating, turning wheel 42 on potentiometer shaft 43 by means of a connecting belt 41. Mounted on shaft 43 is computing cam 45 which raises and lowers cam follower 46 on pointer shaft 34. However, computing clutch 47 has been disengaged throughout the first rotation of shaft 43, so the only connection to the pointer was through the friction drive just described.

Upon the completion of one rotation of shaft 43, a pin (not shown) on the shaft closes step switch S–4 (Fig. 4) momentarily, producing a surge of current through step coil L–3. This advances the contactor of S–2 from terminal 1 to terminal 2. As the contactor of S–2 advances to terminal 2, the arm of S–3 leaves position $d$, disengaging the pointer reset clutch, and passes to $c$, where it connects computing clutch coil L–4 to the direct current source through closed relay contactor K–2 in the balancing portion of the circuit. Computing clutch 47 then engages, connecting cam follower 46 to pointer 35. At this time cam 45 will be positioned so that roller 48 of the cam follower is resting on the cam at point 49 (Fig. 7) and is at the maximum height of its travel. Continued clockwise rotation of shaft 43 at a uniform rate will cause the cam follower to descend at a varying rate due to the cam's shape (discussed previously), the rate of descent decreasing as the follower approaches its lowest point. The cam follower reaches its lowest point after shaft 43 has rotated about 300°. As rotation of the shaft continues the cam follower remains at this low point in its travel momentarily and then rises up the flat surface of the cam preparatory to starting another measurement. The descent of the follower is transmitted to the indicator pointer until the bridge balance point is reached, and produces a corresponding increase in the dial reading.

A lead $x$–1 from terminal 2 of switch S–2 joins the first individual electrode. The other individual electrodes are connected to terminals 3, 4, 5, and 6 respectively. A lead from the conducting arm of S–2 completes the circuit from the electrode to one corner of the high resistance bridge in the balancing circuit. Common electrode 16 is connected to an adjacent corner of the bridge through a supplementary resistor R–4. Thus one arm of the bridge is formed by the resistance of the moist wood pulp located between the electrodes plus the resistance of R–4, whose function it is to increase the measurement range of the bridge at high moistures.

Reading clockwise from resistance R–4, the remaining arms of the bridge are composed of resistances R–1, R–2, and R–3, respectively. The arm of the bridge opposite to the above-mentioned R–4 arm is made up of a precision resistor R–2, which is circular. The contactor arm of this variable resistance or potentiometer is mounted upon shaft 43. Rotation of scan motor M turns shaft 43, rotating the potentiometer arm and connecting more and more resistance from R–2 into the bridge circuit. A fixed potential is applied at opposite corners of the bridge as shown by leads "++" and "– –". As the effective value of R–2 increases, the potential drop in adjacent resistor R–3 decreases. For moistures within the range of the apparatus a value of R–2 is reached such that R–2 forms the same fraction of R–2 plus R–3 as R–1 does of R–1 plus R–4 plus the unknown resistance between electrodes 11 and 16. This is known as the balance or end point of the measurement.

At balance, there is no current through bridge balance meter G because the potentials on both sides of it are equal. Connected across the bridge in parallel with meter G is coil L–5 of a galvanometer relay, whose contactor K–1 is closed only while R–2 is too small for balance. Driven by the scan motor, the R–2 wiper arm continues to increase the effective value of R–2, passing beyond the measurement end point and unbalancing the bridge in the opposite direction from its previous unbalance. This reversal of potential changes the direction of current through L–5, retracting K–1 and breaking the circuit to a second relay coil L–6, which is in series with a protective resistance R–5. Cessation of current through L–6 releases contactor K–2, breaking the circuit to computing clutch coil L–4.

Upon disengagement of computing clutch 47 at balance, pointer 35 stops rotating. Scan motor M continues to drive the arm of potentiometer R–2 throughout an entire circle. Upon completion of 360° rotation the shaft pin depresses S–4 again, switching S–2 from terminal 2 to terminal 3. This disconnects the first electrode pair from the bridge and replaces it by the next pair. Another moisture reading is made at the location of this second set of electrodes in the same manner as was the previous one. At the end of this reading, S–2 moves successively to terminals 4, 5, and 6, and the process is repeated at each of them.

As the arm of S–2 eventually moves to terminal 7, stop switch S–5 operates, removing the power from scan motor M and releasing solenoid 25 to air valve 22. The valve closes, shutting off the air and (by venting or other suitable means) releasing the electrode pistons. This unclamps the sheet whose moisture content was just measured. The operator may then remove it. The instrument will remain inactive until another sheet is inserted and the start switch S–1 is depressed, when the entire measuring cycle will repeat.

Occasionally a wet spot occurring in the sheet at the place of measurement may prevent the attainment of balance within the range of the instrument. It is then necessary to disengage computing cam 45 from cam follower 46 in order to prevent the rising of the follower at the end of the rotational cycle from reversing the direction of movement of pointer 35, which would constitute a subtraction from the moisture reading. Switch S–6, operated by cam 45, accomplishes this by interrupting the circuit to computing clutch coil L–4, disengaging computing clutch 47 throughout the rise of cam follower 46. In Fig. 7 cam follower 46 is shown in the act of rising up the flat surface of cam 45 toward the position of maximum height at point 48.

Dial 37 is calibrated in percent moisture, the minimum reading being 4% and the maximum 9%. During resetting, pointer 35 moves counterclockwise to stop pin 36 at the minimum position on the dial. As the first electrode reading begins, 35 moves slowly clockwise across the dial face at a rate equal to one-fifth of the incremental moisture equivalent of the potentiometer shaft movement. When the arm of potentiometer R-2 reaches a position where the resistance through the sheet is balanced, the pointer is released at the position of its latest advance. The instrument switches the next electrode pair into position for a reading, and the pointer moves clockwise from its last position as soon as the reading begins, stopping at balance as before. The ultimate position of the pointer at conclusion of the last reading represents the average moisture based upon the five individual measurements just taken. The pointer retains its reading until reset as described previously.

In summary, the size of an electric potential drop between two electrodes on opposite sides of a cellulose sheet is measured by comparing it in a bridge arrangement with a continuously increasing potential drop whose instantaneous value is known to correspond to a certain moisture content. The variable or scanning potentiometer producing this potential drop is actuated by a motor that also operates a moisture indicator. When the varying potential balances the unknown value that exists across the material being measured, the indicator mechanism is automatically disengaged from the scanning motor. For greater precision of measurement, readings at several locations on the pulp-sheet are desirable, so each of five separate electrode pairs participates in the measurement. The average moisture reading then appears on a dial linearly calibrated by means of a cam linkage with the scanning motor.

The dial can be read easily to the closest tenth of one percent, and the instrument reproduces its measurements with as good precision. Its accuracy to at least this degree has been proved by the familiar method of oven-drying the samples tested. However, the great rapidity with which the method of measurement of this invention can be carried out represents a tremendous advance in accuracy, as well as in convenience, because the cellulose sheets may be used immediately after measurement before their moisture content has time to vary further. Since no destruction of the sample tested occurs when the measurement is made according to this invention, all the material so tested is available for subsequent use. The operator need only put the sheet whose moisture content is to be measured into a slot in the front of the instrument, push the start button, wait for the instrument to complete the measurement, and then remove the sheet. The moisture reading on the dial is available for recording at any time after the conclusion of one series of measurements and before the beginning of the next.

Since many different embodiments of the invention may be made without departing from the spirit and scope thereof, it is to be understood that the invention is not limited by the specific illustrations except to the extent defined in the following claims.

What is claimed is:

1. Apparatus for determining the moisture content of material by measuring the electrical resistance of the material at a plurality of locations which comprises a plurality of electrodes arranged to be applied in paired relationship to different portions of the material undergoing measurement so that each pair of electrodes is spaced a predetermined distance apart to include the resistances of different samples of the material, a bridge circuit including in one arm thereof a pair of electrodes and the included resistance of a sample, a sampling unit for successively connecting each pair of electrodes into said bridge circuit in turn, adjustable resistor means located in said bridge circuit for comparison of various resistances with the resistance of one of said samples until a bridge balance is obtained, a wiper arm mounted on a rotatable shaft for adjusting said resistor, driver means for rotating said wiper arm shaft from an initial position through successive positions corresponding to decreasing amounts of sample resistance at bridge balance and then back to the initial position, computer-indicator means actuated by rotation of said wiper arm shaft to indicate measured moisture values and bridge-operated relay means to discontinue said actuation of the indicator means at bridge balance and then resume said actuation after a different pair of electrodes has been connected into the bridge circuit and said wiper arm shaft has rotated back to its initial position.

2. Apparatus as defined in claim 1 in which said electrodes comprise a plurality of conductive elements arranged to contact one surface of a sheet of material for which the moisture content is to be determined and a single conductive element arranged to contact the other surface of the sheet opposite to said plurality of elements.

3. Apparatus as defined in claim 1 in which said sampling unit comprises a magnetically operated switch controlled by rotation of said wiper arm to switch automatically to the next electrode-sample circuit.

4. Apparatus as defined in claim 1 in which said computer-indicator means comprises an indicator reading in approximately equal increments of moisture, an indicator shaft for operating said indicator, a cam mounted on said wiper arm shaft engaging a cam follower mounted on said indicator shaft, said cam being so shaped as to cause approximately equal increments of displacement of the indicator shaft for equal increments of moisture in the sample being measured, and electrically operated clutch means responsive to said bridge-operated relay means for disconnecting said cam follower from said indicator.

5. In an apparatus for determining the moisture content of material by measuring the electrical resistance of a sample of the material with a high resistance bridge circuit, an adjustable resistor for balancing said bridge, a wiper arm mounted on a rotatable shaft for adjusting said resistor, an indicator reading in approximately equal increments of moisture, an indicator shaft for operating said indicator, a cam mounted on said wiper arm shaft engaging a cam follower mounted on said indicator shaft, said cam being so shaped as to cause approximately equal increments of displacement of the indicator shaft for equal increments of moisture in the sample being measured, electrically operated clutch means for disconnecting said cam follower from said indicator, and bridge-operated relay means for operating said clutch means to disconnect said cam follower at bridge balance.

6. Apparatus for determining the moisture content of material by measuring the electrical resistance of the material at a plurality of locations which comprises a plurality of electrodes arranged to be applied in paired relationship to different portions of the material undergoing measurement so that each pair of electrodes is spaced a predetermined distance apart to include the resistances of different samples of the material, a bridge circuit including in one arm thereof a pair of electrodes and the included resistance of a sample, a sampling unit for successively connecting each pair of electrodes into said bridge circuit in turn, adjustable resistor means located in said bridge circuit for comparison of various resistances with the resistance of one of said samples until a bridge balance is obtained, driver means for adjusting said resistor throughout its range, computer-indicator means actuated by adjustment of said resistor to indicate measured moisture values and bridge-operated relay means to discontinue said actuation of the indicator means at bridge balance and then resume said actuation after a different pair of electrodes has been connected into the bridge circuit and said resistor has been returned to its initial position.

JOHN ROBERT SPALDING.

REFERENCES CITED

The following references are of record in the file of this patent:

UNITED STATES PATENTS

| Number | Name | Date |
|---|---|---|
| 1,821,605 | Andersen | Sept. 1, 1931 |
| 2,263,017 | Sparrow | Nov. 18, 1941 |
| 2,270,732 | Jones | Jan. 20, 1942 |
| 2,342,685 | Norcross | Feb. 29, 1944 |
| 2,508,045 | Seney | May 16, 1950 |